United States Patent [19]
Zones et al.

[11] Patent Number: 5,785,947
[45] Date of Patent: Jul. 28, 1998

[54] PREPARATION OF ZEOLITES USING ORGANIC TEMPLATE AND AMINE

[75] Inventors: Stacey I. Zones, San Francisco; Yumi Nakagawa, Oakland, both of Calif.

[73] Assignee: Chevron U.S.A. Inc., San Francisco, Calif.

[21] Appl. No.: 714,025

[22] Filed: Sep. 11, 1996

Related U.S. Application Data

[63] Continuation-in-part of Ser. No. 407,432, Mar. 17, 1995, abandoned, which is a continuation-in-part of Ser. No. 130,217, Oct. 1, 1993, abandoned, which is a continuation-in-part of Ser. No. 42,842, Apr. 6, 1993, abandoned, which is a continuation of Ser. No. 809,652, Dec. 18, 1991, abandoned.

[51] Int. Cl.$^6$ ............................................. C01B 39/04
[52] U.S. Cl. .................. 423/705; 423/706; 423/707; 423/708; 423/DIG. 23; 423/DIG. 33; 423/DIG. 35; 502/62
[58] Field of Search .................. 423/703, 704, 423/705, 706, 707, 708, DIG. 23, DIG. 33, DIG. 35; 502/62

[56] References Cited

U.S. PATENT DOCUMENTS

| | | | |
|---|---|---|---|
| 4,151,189 | 4/1979 | Rubin et al. | 310/26 |
| 4,205,053 | 5/1980 | Rollman et al. | 423/DIG. 29 |
| 4,375,458 | 3/1983 | Dwyer et al. | 423/DIG. 33 |
| 4,377,502 | 3/1983 | Klotz | 252/455 |
| 4,481,177 | 11/1984 | Valyocsik | 423/706 |
| 4,483,835 | 11/1984 | Zones | 423/706 |
| 4,495,166 | 1/1985 | Calvert et al. | 423/705 |
| 4,537,754 | 8/1985 | Casci et al. | 423/708 |
| 4,578,259 | 3/1986 | Morimoto et al. | 423/708 |
| 4,663,140 | 5/1987 | Van Erp et al. | 423/704 |
| 4,826,667 | 5/1989 | Zones et al. | 423/706 |
| 4,857,288 | 8/1989 | Marcus et al. | 423/703 |
| 5,053,373 | 10/1991 | Zones | 423/706 |
| 5,057,296 | 10/1991 | Beck | 423/703 |
| 5,063,038 | 11/1991 | Kirker et al. | 423/DIG. 36 |
| 5,171,556 | 12/1992 | Caullet et al. | 423/705 |
| 5,182,090 | 1/1993 | Dwyer et al. | 423/704 |
| 5,200,377 | 4/1993 | Zones et al. | 502/64 |
| 5,246,688 | 9/1993 | Faust | 423/704 |
| 5,273,736 | 12/1993 | Nakagawa | 423/702 |
| 5,350,722 | 9/1994 | Joly et al. | 502/64 |
| 5,376,260 | 12/1994 | Santilli | 208/111 |
| 5,645,812 | 7/1997 | Nakagawa | 423/706 |
| 5,707,600 | 1/1998 | Nakagawa et al. | 423/701 |
| 5,707,601 | 1/1998 | Nakagawa | 423/701 |

FOREIGN PATENT DOCUMENTS

| | | |
|---|---|---|
| 293032 | 11/1988 | European Pat. Off. |
| 2193202 | 2/1988 | United Kingdom |

OTHER PUBLICATIONS

Lok et al. "The Role Organic Molecules in Molecular Sieve Synthesis" Zeolites, vol. 3, pp. 282–291, Oct. 1983.

*Primary Examiner*—Mark L. Bell
*Assistant Examiner*—Louis M. Troilo
*Attorney, Agent, or Firm*—R. J. Sheridan

[57] ABSTRACT

Crystalline zeolites are prepared using a small quantity of an organic templating compound and a larger quantity of an amine component containing at least one amine having from one to eight carbon atoms, ammonium hydroxide, or mixtures thereof.

50 Claims, No Drawings

PREPARATION OF ZEOLITES USING ORGANIC TEMPLATE AND AMINE

CROSS REFERENCE TO RELATED APPLICATIONS

This application is a continuation-in-part of Ser. No. 407,432, filed Mar. 17, 1995, now abandoned which is a continuation-in-part of Ser. No. 130,217, filed Oct. 1, 1993, now abandoned which is a continuation-in-part of Ser. No. 042,842, filed Apr. 6, 1993, now abandoned, which is a continuation of Ser. No. 809,652, filed Dec. 18, 1991, now abandoned.

This application is a continuation-in-part of Ser. No. 407,432, filed Mar. 17, 1995 which is incorporated by reference herein.

BACKGROUND OF THE INVENTION

Natural and synthetic zeolitic crystalline aluminosilicates are useful as catalysts and adsorbents. These aluminosilicates have distinct crystal structures which are demonstrated by X-ray diffraction. The crystal structure defines cavities and pores which are characteristic of the different species. The adsorptive and catalytic properties of each crystalline aluminosilicate are determined in part by the dimensions of its pores and cavities. Thus, the utility of a particular zeolite in a particular application depends at least partly on its crystal structure.

Because of their unique molecular sieving characteristics, as well as their catalytic properties, crystalline aluminosilicates are especially useful in such applications as gas drying and separation and hydrocarbon conversion. Although many different crystalline aluminosilicates and silicates have been disclosed, there is a continuing need for new zeolites and silicates with desirable properties for gas separation and drying, hydrocarbon and chemical conversions, and other applications.

Crystalline aluminosilicates are usually prepared from aqueous reaction mixtures containing alkali or alkaline earth metal oxides, silica, and alumina. "Nitrogenous zeolites" have been prepared from reaction mixtures containing an organic templating agent, usually a nitrogen-containing organic cation. Use of adamantane materials as the templates for making molecular sieves, particularly zeolites, is disclosed in U.S. Pat. No. 4,665,110, issued May 12, 1987 to Zones which is hereby incorporated by reference. Adamantane materials are used as the templates in making a particular zeolite, SSZ-25, as disclosed in U.S. Pat. No. 4,826,667, issued May 2, 1989 to Zones et al., and co-pending application Ser. No. 788,656 filed Nov. 6, 1991, which is a continuation of U.S. Ser. No. 333,666 filed Apr. 5, 1989, both of which are hereby incorporated by reference. Use of hexamethyleneimine as the sole template in making zeolites similar to SSZ-25 is disclosed in U.S. Pats. No. 4,439,409, issued Mar. 27, 1984 to Puppe et al., and 4,954,325, issued Sep. 4, 1990 to Rubin et al., while use of hexamethyleneimine and piperidine as the template in making a zeolite similar to SSZ-25 is disclosed in European Patent Application No. 0,293,032 A2, dated May 11, 1988. Use of adamantanamine materials in making a zeolite other than SSZ-25 is disclosed in U.K. Pat. Application GB 2,193,202 A, dated Feb. 3, 1988. Another zeolite utilizing amines in its manufacture is the intermediate pore-size zeolite ZSM-5. U.S. Pat. No. 4,495,166, issued Jan. 22, 1985 to Calvert et al., discloses use of a small amount of a quaternary ammonium compound such as tetrapropyl ammonium in conjunction with other amines to make ZSM-5.

U.S. Pat. No. 5,057,296, issued Oct. 15, 1991 to Beck, discloses a process for producing ultra-large pore (sometimes called "mesoporous") crystalline materials using a two component system containing an organic template and an amine. These mesoporous materials have uniformly sized pores with a maximum perpendicular cross section of at least about 13 Å. The second component of the system (the amine) is used to expand the pore size of these materials to the required 13 Å or greater size by expanding the micelle created to form these mesoporous materials.

The mesoporous materials of the Beck patent are considered very different from microporous materials, such as zeolites, and are not currently considered to be zeolites.

SUMMARY OF THE INVENTION

Crystalline, microporous aluminosilicate molecular sieves have been prepared in accordance with this invention using a highly effective new method.

In accordance with this invention there is provided a method for preparing a zeolite selected from the group consisting of large pore zeolites, medium pore zeolites having unidimensional channels, and small pore zeolites, said method comprising:

A. forming an aqueous reaction mixture comprising (1) a source of an oxide selected from silicon oxide, germanium oxide and mixtures thereof; (2) a source of an oxide selected from aluminum oxide, gallium oxide, iron oxide, boron oxide, titanium oxide and mixtures thereof; (3) a source of an alkali metal oxide; (4) an amine component comprising at least one amine containing one to eight carbon atoms, ammonium hydroxide, and mixtures thereof, and (5) an organic templating compound capable of forming said zeolite in the presence of said amine, wherein said amine is smaller than said organic templating compound; and B. maintaining said aqueous mixture under sufficient crystallization conditions until crystals are formed.

There is further provided in accordance with this invention an improved method for preparing a zeolite selected from the group consisting of large pore zeolites, medium pore zeolites having unidimensional channels, and small pore zeolites from source materials for said zeolite and an organic templating compound, the improvement comprising employing a mixture of (1) said organic templating compound, and (2) an amine component comprising at least one amine containing one to eight carbon atoms, ammonium hydroxide, and mixtures thereof, said amine being smaller than said organic templating compound and said organic templating compound being capable of forming said zeolite in the presence of said amine.

The present invention also provides these processes wherein the organic templating compound is selected from the group consisting of quaternary ammonium ions, cyclic amines and polar adamantyl derivatives.

In a preferred embodiment, the present invention provides these processes wherein the organic templating compound is used in an amount less than that required to fill all of the micropore volume of the zeolite, i.e., an amount less than that required to crystallize the zeolite in the absence of the amines of this invention.

In accordance with this invention, there is also provided a zeolite having an as-synthesized molar composition in an anhydrous state of (0.02 to 2.0) Q: (0.02 to 1.0) Z: (0.1 to 2.0) $M_2O:W_2O_3$: (10 to 200) $YO_2$, wherein M is an alkali metal cation; W is selected from aluminum, gallium, iron, boron, titanium and mixtures thereof; Y is selected from silicon, germanium, and mixtures thereof; Z is an amine component comprising at least one amine containing from one to eight carbon atoms, ammonium hydroxide, and mixtures thereof; and Q is an organic templating compound capable of forming the zeolite in the presence of the amine.

Among other factors, the present invention is based on the discovery that amines which could be used in the synthesis of small and medium pore-sized zeolites can be used to synthesize the large-pore zeolites, such as the zeolite known as "Zeolite SSZ-25" or simply "SSZ-25", when used in conjunction with a small amount of an organic templating compound, such as an adamantane compound for SSZ-25. For example, ZSM-5, a medium pore size, multidimensional zeolite, was produced when the amine piperidine or cyclopentylamine was used alone (see Table 4, Examples 7 and 9) as the templating compound. However, when a small amount of an adamantyl quaternary ammonium ion was used in combination with piperidine or cyclopentylamine, the large-pore zeolite SSZ-25 resulted (see Table 4, Examples 6 and 8). This is particularly surprising since the amount of the adamantyl quaternary ammonium ion that was used was insufficient to cause significant growth of SSZ-25 if used without other amines present.

It was wholly unexpected that amines such as isobutyl, neopentyl, or monomethyl amine could be used in relatively large quantities to produce zeolites such as SSZ-25 (see Table 3, Examples 3 and 4). Use of amines containing from one to eight carbon atoms provides significant cost savings over the method of using, e.g., an adamantyl quaternary ammonium ion as the sole source of organic component. Additional manufacturing flexibility can be obtained, since the process no longer depends on the availability of large quantities of one particular amine.

In addition to these discoveries, it was found that polar adamantyl derivatives could be substituted for the more costly adamantyl quaternary ammonium ions being used in combination with the amine component to prepare SSZ-25 (see Examples 4, 5, 11, and 12), even though these polar adamantyl derivatives do not result in crystallization of SSZ-25 when used alone. Therefore, the cost of making SSZ-25 is further reduced.

Substantial reductions in growth time also occurred unexpectedly when using the organic component mixture comprising an amine component and an organic templating compound. Growth times improved by a factor of from approximately two to approximately five in some examples. The commercial benefits of reduced plant construction cost for a given production rate will be substantial.

DETAILED DESCRIPTION OF PREFERRED EMBODIMENTS

The zeolites prepared in accordance with this invention are microporous, crystalline materials which have a mole ratio of an oxide selected from silicon oxide, germanium oxide, and mixtures thereof to an oxide selected from aluminum oxide, gallium oxide, iron oxide, boron oxide, titanium oxide and mixtures thereof in the range of 10 to 200. These zeolites further have a composition, as synthesized and in the anhydrous state, in terms of mole ratios as follows: (0.02 to 2.0)Q:(0.02 to 1.0)Z:(0.1 to 2.0) $M_2O:W_2O_3$:(10 to 200)$YO_2$, wherein M is an alkali metal cation; W is selected from aluminum, gallium, iron, boron, titanium and mixtures thereof; Y is selected from silicon, germanium, and mixtures thereof; Z is an amine component comprising at least one amine containing from one to eight carbon atoms, ammonium hydroxide, and mixtures thereof; and Q is an organic templating agent capable of forming the zeolite in the presence of the amine.

The present invention involves a novel method for preparing zeolites, comprising the preparation of an aqueous mixture that contains sources of a minor quantity of an organic templating compound capable of forming the desired zeolite, a larger quantity of an amine component containing at least one small amine ranging from 1 to 8 carbons, and/or ammonium hydroxide, and preferably seeds of the desired zeolite. Preferably, the amine component is an aliphatic or cycloaliphatic amine containing no more than 8 carbon atoms or mixtures of such compounds.

This invention provides considerable cost improvement and flexibility in choice of organic components, and most surprisingly, faster crystallization rates.

The present invention is useful in preparing large pore zeolites having unidimensional channels, large pore zeolites having multidimensional channels, medium pore zeolites having unidimensional channels, small pore zeolites having unidimensional channels and small pore zeolites having multidimensional channels. As used herein, the term "large pore zeolite" refers to zeolites which have $\geq$12-ring openings in their framework structure, the term "medium pore zeolites" refers to zeolites which have 10-ring openings in their framework structure, and the term "small pore zeolites" refers to zeolites which have $\leq$8-ring openings in their framework structure. In addition, the term "unidimensional" or "unidimensional channels" refers to the fact that the pores in the zeolite form channels which are essentially parallel and do not intersect, and the term "multidimensional" or "multidimensional channels" refers to the fact that the pores in the zeolite form channels which do intersect each other.

The reaction mixtures used to prepare the zeolites by the method of this invention may have a composition, in terms of mole ratios, falling within the following ranges: $YO_2:W_2O_3$, 10:1 to 200:1; $M:YO_2$ 0.01:1 to 0.50:1; $OH^-:YO_2$ 0.01:1 to 0.60:1; $Q/YO_2$ 0.02:1 to 1.00:1 and $Z/YO_2$ 0.02:1 to 1.00:1, where Y is selected from silicon, germanium, and mixtures thereof; W is selected from aluminum, gallium, iron, boron, titanium and mixtures thereof; M is an alkali metal cation; Z is an amine component comprising at least one amine containing from one to eight carbon atoms, ammonium hydroxide, or mixtures thereof; and Q is an organic templating compound capable of forming the zeolite in the presence of the amine.

In some instances, the alkali metal cation level in the reaction mixture should be carefully controlled. It has now been discovered that alkali metal cation:$SiO_2$ mole ratios much above 0.40 can favor the formation of the zeolites ZSM-5 and mordenite. Indeed, it has been found that at high alkali metal cation:$SiO_2$ mole ratios, these two zeolites can be produced even in the absence of any organic templating compound. Thus, in order to ensure that the desired zeolite is produced, it is advisable to carefully control the alkali metal cation content in the reaction mixture. To this end, it may also be advisable to avoid using reagents such as sodium and potassium silicates.

The present invention will now be described with respect to one of the zeolites, SSZ-25, which can be made using the method of this invention. It is understood that the other zeolites which can be made using this method are made in substantially the same way. SSZ-25 has a mole ratio of an oxide selected from silicon oxide, germanium oxide, and mixtures thereof to an oxide selected from aluminum oxide, gallium oxide, iron oxide, boron oxide, titanium oxide and mixtures thereof in the range of 10 to 200, and having the X-ray diffraction lines of Table 2 below. The zeolite further has a composition, as synthesized and in the anhydrous state, in terms of mole ratios of oxides as follows: (0.02 to 2.0)Q: (0.20 to 1.0)Z: (0.1 to 2.0)$M_2O$:$W_2O_3$: (10 to 200)$YO_2$, wherein M is an alkali metal cation; W is selected from aluminum, gallium, iron, boron, titanium and mixtures thereof; Y is selected from silicon, germanium, and mixtures thereof; and Q is an adamantane compound comprising at least one compound chosen from the group consisting of adamantane quaternary ammonium ions and polar adamantyl derivatives, and Z is an amine component comprising at least one amine chosen from amines containing from one to eight carbon atoms. SSZ-25 zeolites can have a $YO_2$:$W_2O_3$ mole ratio in the range of about 10 to 200. As prepared, the silica to alumina mole ratio is typically in the range of about 15:1 to about 100:1. Higher mole ratios can be obtained by treating the zeolite with chelating agents or acids to extract aluminum from the zeolite lattice. The silica to alumina mole ratio can also be increased by using silicon and carbon halides and other similar compounds. Preferably, SSZ-25 is an aluminosilicate wherein W is aluminum and Y is silicon.

SSZ-25 zeolites, as synthesized in the presence of adamantyl compounds, have crystalline structures with the X-ray powder diffraction patterns containing the following characteristic lines:

TABLE 1(a)

| 2θ    | d/n   | Int.  |
|-------|-------|-------|
| 5.0   | 17.7  | 2 Br  |
| 6.92  | 12.77 | 28    |
| 7.06  | 12.52 | 26    |
| 7.87  | 11.23 | 21    |
| 8.78  | 10.07 | 1     |
| 9.31  | 9.5   | 5     |
| 9.93  | 8.91  | 42    |
| 12.47 | 7.10  | 2     |
| 12.79 | 6.92  | 7     |
| 14.00 | 6.33  | 22    |
| 14.21 | 6.23  | 24    |
| 14.67 | 6.04  | 10    |
| 15.87 | 5.58  | 15    |
| 17.65 | 5.02  | 2     |
| 18.89 | 4.70  | 5     |
| 20.02 | 4.44  | 13    |
| 20.15 | 4.41  | 12    |
| 21.02 | 4.23  | 9     |
| 21.48 | 4.14  | 11    |
| 21.75 | 4.09  | 16    |
| 22.28 | 3.99  | 14    |
| 22.60 | 3.93  | 33    |
| 23.60 | 3.77  | 25    |
| 24.60 | 3.62  | 6     |
| 24.84 | 3.58  | 10    |
| 25.10 | 3.55  | 11    |
| 25.88 | 3.44  | 67    |
| 26.83 | 3.32  | 15    |
| 27.64 | 3.23  | 20    |
| 28.47 | 3.14  | 16    |
| 29.00 | 3.08  | 1     |
| 29.54 | 3.02  | 3     |
| 31.42 | 2.85  | 3     |
| 32.15 | 2.78  | 4     |
| 33.23 | 2.70  | 7     |
| 34.22 | 2.62  | 3     |

TABLE 1(b)

| 2θ    | d/n   | Int.  |
|-------|-------|-------|
| 7.08  | 12.49 | 40    |
| 7.89  | 11.21 | 25    |
| 8.89  | 9.95  | 6     |
| 9.91  | 8.93  | 46    |

TABLE 1(b)-continued

| 2θ    | d/n   | Int.  |
|-------|-------|-------|
| 11.43 | 7.74  | 1     |
| 12.80 | 6.92  | 9     |
| 14.00 | 6.33  | Sh    |
| 14.22 | 6.23  | 35    |
| 14.68 | 6.03  | 13    |
| 15.87 | 5.58  | 17    |
| 17.75 | 5.00  | 2     |
| 18.95 | 4.68  | 6     |
| 19.38 | 4.58  | 10    |
| 19.58 | 4.53  | 9     |
| 20.05 | 4.43  | 13    |
| 20.15 | 4.41  | Sh    |
| 21.00 | 4.23  | 5     |
| 21.49 | 4.13  | 10    |
| 21.78 | 4.08  | 17    |
| 22.30 | 3.99  | Sh    |
| 22.58 | 3.94  | 35    |
| 23.59 | 3.77  | 25    |
| 24.55 | 3.63  | Sh    |
| 24.82 | 3.59  | 10    |
| 25.07 | 3.55  | 5     |
| 25.85 | 3.45  | 68    |
| 26.48 | 3.37  | 3     |
| 26.85 | 3.32  | 16    |
| 27.64 | 3.23  | 19    |
| 28.46 | 3.14  | 14    |
| 28.98 | 3.08  | 3     |
| 29.60 | 3.02  | 4     |
| 31.42 | 2.85  | 4     |
| 32.18 | 2.78  | 5     |
| 33.21 | 2.70  | 7     |
| 34.22 | 2.62  | 2     |

As can be seen in Tables 1(a) and 1(b), X-ray diffraction patterns of the as synthesized SSZ-25 will vary.

After calcination, the SSZ-25 zeolites have a crystalline structure whose X-ray powder diffraction pattern shows the following characteristic lines as indicated in Table 2 below:

TABLE 2

| 2θ    | d/n    | $I/I_o$ |
|-------|--------|---------|
| 3.4   | 25.5   | 17      |
| 7.19  | 12.30  | 100     |
| 8.04  | 11.00  | 55      |
| 10.06 | 8.78   | 63      |
| 14.35 | 6.17   | 40      |
| 16.06 | 5.51   | 17      |
| 22.77 | 3.90   | 38      |
| 23.80 | 3.74   | 20      |
| 26.08 | 3.417  | 65      |

The X-ray powder diffraction patterns were determined by standard techniques. The radiation was the K-alpha/doublet of copper and a scintillation counter spectrometer with a strip-chart pen recorder was used. The peak heights I and the positions, as a function of 2θ where θ is the Bragg angle, were read from the spectrometer chart. From these measured values, the relative intensities, $100I/I_o$, where $I_o$ is the intensity of the strongest line or peak, and d, the interplanar spacing in Angstroms corresponding to the recorded lines, can be calculated. Variations in the diffraction pattern can result from variations in the organic component used in the preparation and from variations in the silica-to-alumina mole ratio from sample to sample. The zeolite produced by exchanging the metal or other cations present in the zeolite with various other cations yields a similar diffraction pattern, although there can be shifts in interplanar spacing as well as variations in relative intensity.

Calcination can also cause shifts in the X-ray diffraction pattern. Notwithstanding these perturbations, the basic crystal lattice structure remains unchanged.

Zeolites can be suitably prepared from an aqueous solution containing sources of an alkali metal oxide, an organic component mixture, an oxide of aluminum, gallium, iron, boron, titanium or mixtures thereof, and an oxide of silicon or germanium, or mixture of the two. The reaction mixture should have a composition in terms of mole ratios falling within the following ranges:

|  | Broad | Preferred |
| --- | --- | --- |
| M/YO$_2$ | 0.01–0.50 | 0.10–0.20 |
| OH$^-$/YO$_2$ | 0.01–0.60 | 0.10–0.30 |
| H$_2$O/YO$_2$ | 10–120 | 20–50 |
| Q/YO$_2$ | 0.02–1.00 | 0.02–0.10 |
| YO$_2$/W$_2$O$_3$ | 10–200 | 15–120 |
| Z/YO$_2$ | 0.05–1.00 | 0.20–0.40 | where M is an alkali metal, preferably sodium or potassium; Y is silicon, germanium, or both; Q is an adamantane component comprising at least one compound chosen from the group consisting of adamantane quaternary ammonium ions and polar adamantyl derivatives, Z is an amine component comprising at least one amine chosen from amines containing from one to eight carbon atoms, ammonium hydroxide and mixtures thereof; and W is aluminum, gallium, iron, boron, titanium or mixtures thereof.

The reaction mixture can also be seeded with as-made zeolite crystals both to direct and accelerate the crystallization, as well as to minimize the formation of undesired aluminosilicate contaminants.

By "polar adamantyl derivative" is meant adamantyl compounds which contain either (a) a nitrogen atom that can bear a lone pair of electrons or an electropositive charge, or (b) an hydroxyl substituent. By "adamantane quaternary ammonium ions" is meant adamantane materials containing a nitrogen atom which is chemically bonded to four substituents, at least three of which are methyl groups and at least one of which is an adamantyl compound. By an "adamantane compound" or "adamantane component" is meant a composition comprising at least one compound chosen from the group consisting of adamantane quaternary ammonium ions and polar adamantyl derivatives. By "amine component" is meant at least one amine chosen from the group of amines having from one to eight carbon atoms, ammonium hydroxide or mixtures thereof. Preferably, the amine is an aliphatic or cycloaliphatic amine containing no more than 8 carbon atoms and mixtures thereof. By "organic component mixture" is meant a mixture comprising the organic templating compound and the amine component. By "seed material" is meant a material which reduces growth times of the zeolite crystals.

One example of a seed material for SSZ-25 is as-made SSZ-25. By "SSZ-25" is meant a material consisting substantially of the crystalline material with an X-ray diffraction pattern corresponding substantially to that of Table 2 after calcination of the as-made material.

The reaction mixture is prepared using standard zeolitic preparation techniques. Typical sources of aluminum oxide for the reaction mixture include aluminates, alumina, hydrated aluminum hydroxides, and aluminum compounds such as AlCl$_3$ and Al$_2$(SO$_4$)$_3$. Typical sources of silicon oxide include silica hydrogel, silicic acid, colloidal silica, tetraalkyl orthosilicates, silica hydroxides, and fumed silicas. Gallium, iron, boron, titanium and germanium can be added in forms corresponding to their aluminum and silicon counterparts. Trivalent elements stabilized on silica colloids are also useful reagents.

The organic component mixture used to prepare SSZ-25 may contain adamantane quaternary ammonium ions. The adamantane quaternary ammonium ions are derived from a compound of the formula:

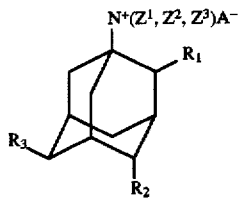

(I)

$$N^+(Z^1, Z^2, Z^3)A^-$$

wherein each of Z$^1$, Z$^2$ and Z$^3$ independently is lower alkyl and most preferably methyl; A$\theta$ is an anion which is not detrimental to the formation of the zeolite; and each of R$^1$, R$^2$ and R$^3$ independently is hydrogen, or lower alkyl and most preferably hydrogen; and

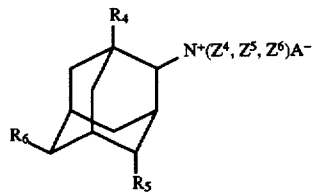

(II)

$$N^+(Z^4, Z^5, Z^6)A^-$$

wherein each of R$^4$, R$^5$ and R$^6$ independently is hydrogen or lower alkyl; and most preferably hydrogen; each of Z$^4$, Z$^5$ and Z$^6$ independently is lower alkyl and most preferably methyl; and A$^-$ is an anion which is not detrimental to the formation of the zeolite. Mixtures of compounds having formula (I) and/or (II) can also be used. By "lower alkyl" is meant alkyl of from about 1 to 5 carbon atoms.

A$^-$ is an anion which is not detrimental to the formation of the zeolite. Representative of the anions include halide, e.g., fluoride, chloride, bromide and iodide, hydroxide, acetate, sulfate, carboxylate, etc. Hydroxide is the most preferred anion. It may be beneficial, for example, to ion-exchange the halide for hydroxide ion, thereby reducing the alkali metal hydroxide quantity required.

The adamantane quaternary ammonium compounds are prepared by methods known in the art.

The organic component mixture used to prepare SSZ-25 may contain a polar adamantyl derivative. The polar adamantyl derivative is commercially available and includes compounds such as 1-adamantanamine, 2-adamantanamine, 1-aminomethyl adamantane, 1-adamantanol, 2-adamantanol and mixtures of such compounds. Use of the polar adamantyl derivative instead of adamantane quaternary ammonium ions permits a reduction of production cost when making SSZ-25.

The organic component mixture used to prepare SSZ-25 also contains an amine component comprising at least one amine chosen from amines containing from one to eight carbon atoms, ammonium hydroxide and mixtures thereof. These amines are smaller than the organic templating compound used to prepare the zeolite. As used herein, the term "smaller", when used with respect to the amine component, means that the amine is lower in molecular weight than the organic templating compound and typically is no larger physically than the organic templating compound. Non-exclusive examples of these amines include isopropylamine, isobutyl amine, n-butylamine, piperidine, 4-methylpiperidine, cyclohexylamine, 1,1,3,3-tetramethyl butyl amine and cyclopentylamine and mixtures of such amines.

Use of these amines permits a reduction in the amount of the adamantane compound (or other organic templating compound) used, and significant cost savings result. In fact, it has quite surprisingly been found that, by using the amine component of the present invention, the amount of organic templating compound can be reduced to a level below that which is required to fill the micropore volume of the zeolite, i.e., an amount less than that required to crystallize the zeolite in the absence of the amines of this invention. In addition, use of these amines unexpectedly promotes faster growth times when used in combination with seed material.

In the previous SSZ-25 synthesis that relied completely on the quaternized adamantammonium derivative in larger quantity, a minimum of usually 160 hours was required to obtain the crystallized SSZ-25. By using an adamantane compound in conjunction with an amine component and seed material, crystallization periods of approximately 50 hours have been observed. A significant cost reduction in commercial use will occur as a result of the substantial reduction in crystallization period, since less equipment time is needed to grow SSZ-25 for a given production rate.

The reaction mixture used to prepare SSZ-25 can be seeded with material such as SSZ-25 crystals both to direct, and accelerate the crystallization, as well as to minimize the formation of undesired aluminosilicate contaminants.

The preferred reaction mixture for making SSZ-25 comprises 1-adamantanamine, isobutylamine, and SSZ-25 seeds as formulated in Example 17.

The reaction mixture is maintained at an elevated temperature until the crystals of the zeolite are formed. The temperatures during the hydrothermal crystallization step are typically maintained from about 140° C. to about 200° C., preferably from about 160° C. to about 180° C., and most preferably from about 170° C. to about 180° C. The crystallization period is typically greater than 1 day and preferably from about 2 days to about 5 days.

The hydrothermal crystallization is conducted under pressure and usually in an autoclave so that the reaction mixture is subject to autogenous pressure. The reaction mixture can be stirred during crystallization. During the hydrothermal crystallization step, the zeolite crystals can be allowed to nucleate spontaneously from the reaction mixture.

Once the zeolite crystals have formed, the solid product is separated from the reaction mixture by standard mechanical separation techniques such as filtration. The crystals are water-washed and then dried, e.g., at 90° C. to 120° C. for from 8 to 24 hours, to obtain the as-synthesized zeolite crystals. The drying step can be performed at atmospheric or subatmospheric pressures.

The synthetic zeolites can be used as synthesized or can be thermally treated. By "thermal treatment" is meant heating to a temperature from about 200° C. to about 820° C., either with or without the presence of steam. Usually, it is desirable to remove the alkali metal cation by ion exchange and replace it with hydrogen, ammonium, or any desired metal ion. Thermal treatment including steam helps to stabilize the crystalline lattice from attack by acids. The zeolite can be leached with chelating agents, e.g., EDTA or dilute acid solutions, to increase the silica:alumina mole ratio. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or the metals can be physically intimately admixed with the zeolite using standard methods known to the art. Also, the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, acetates, and sulfates are particularly preferred. Representative ion exchange techniques are disclosed in a wide variety of patents including U.S. Pat. Nos. 3,140,249, issued Jul. 7, 1964 to Plank et al., 3,140,251, issued Jul. 7, 1964 to Plank et al., and 3,140,253, issued Jul. 7, 1964 to Plank et al. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of cations present in the synthesized form of the zeolite, the spatial arrangement of the atoms which form the basic crystal lattice of the zeolite remains essentially unchanged. The exchange of cations has little, if any, effect on the zeolite lattice structures.

The zeolites can be formed into a wide variety of physical shapes. Generally speaking, the zeolite can be in the form of a powder, a granule, or a molded product, such as extrudate having particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or dried or partially dried and then extruded. The zeolite can be composited with other materials resistant to the temperatures and other conditions employed in organic conversion processes. By "matrix material" is meant other materials with which the zeolite is combined to make catalyst particles. Such matrix materials may include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Catalysts produced with zeolites or other components incorporated therein may be subject to further ion exchange steps, metal inclusion, thermal treatment, and other processing steps as previously discussed for the zeolite alone.

Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the zeolites can be composited with porous matrix materials and mixtures of matrix materials such as silica, alumina, titania, magnesia, silica:alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolites can also be composited with other zeolites such as synthetic and natural faujasites (e.g., X and Y), erionites, and mordenites. They can also be composited with purely synthetic zeolites such as those of the ZSM series. The combination of zeolites can also be composited in a porous inorganic matrix. Zeolites are useful in hydrocarbon conversion reactions. Examples of these uses are described in U.S. Pat. No. 4,826,667, issued May 2, 1989 to Zones et al., which is incorporated herein by reference.

While the foregoing description has involved primarily the preparation of SSZ-25, it should be emphasized that other zeolites can be prepared using the method of this invention. For example, the zeolites known as SSZ-32, SSZ-28, EU-1, SSZ-35, ferrierite, ZSM-12 and ZSM-22 type structures have been successfully prepared in accordance with this invention. When it is desired to prepare these or other zeolites by the method of this invention, an organic templating compound capable of producing the desired zeolite in the presence of the amine component is employed.

In general, the mole ratios of the components of the reaction mixtures used to prepare these zeolites will be the same as, or very similar to, those described above with respect to SSZ-25, except, of course that the structure of the organic templating compound (Q) used will depend upon the zeolite desired to be made. Also, the composition of the reaction mixture may vary slightly depending upon the zeolite desired to be made.

Zeolite SSZ-32

To prepare SSZ-32, an N-lower alkyl-N'-isopropylimidazolium cation may be used as the organic templating compound. These compounds have the general formula:

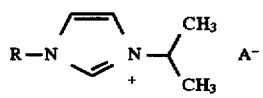

(III)

wherein R is lower alkyl containing 1 to 5 carbon atoms (preferably methyl or isopropyl) and A⁻ is an anion which is not detrimental to the formation of the zeolite. Representative anions include halogens, e.g., fluoride, chloride, bromide and iodide, hydroxide, acetate, sulfate, carboxylate, and the like. Hydroxide is the most preferred anion.

The preferred N-lower alkyl-N'-isopropylimidazolium cations are N,N'-diisopropylimidazolium cation and N-methyl-N'-isopropylimidazolium cation.

Another type of organic template which can be employed to prepare SSZ-32 are N,N,N-trialkyl-1,1,3,3-tetraalkylbutyl ammonium cations, which have the general formula:

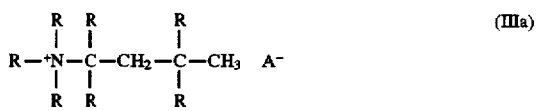

(IIIa)

where R and A are as defined above for formula III.
Preferably, R is methyl.

The as-made SSZ-32 zeolites have a crystalline structure whose X-ray powder diffraction pattern shows the following characteristic lines as indicated in Table A below:

TABLE A

| 2Theta | d/n | I/I₀ |
|---|---|---|
| 8.04 | 10.99 | 30.2 |
| 8.81 | 10.03 | 12.6 |
| 11.30 | 7.82 | 23.1 |
| 18.08 | 4.90 | 8.0 |
| 19.56 | 4.53 | 61.2 |
| 20.81 | 4.26 | 65.1 |
| 22.75 | 3.90 | 100.0 |
| 23.89 | 3.72 | 85.6 |
| 24.59 | 3.62 | 34.9 |
| 25.16 | 3.53 | 21.9 |
| 25.91 | 3.43 | 41.8 |
| 26.89 | 3.31 | 7.2 |
| 28.13 | 3.17 | 11.5 |
| 29.30 | 3.04 | 5.9 |
| 31.48 | 2.84 | 6.0 |

ZSM-22 type zeolite

The organic templating compounds which may be used to prepare ZSM-22 type structures include imidazole salts characterized by the following formula:

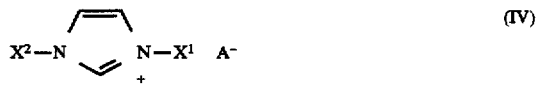

(IV)

wherein $X^1$ and $X^2$ independently represent a linear alkyl group containing from 1 to about 10 carbon atoms and A⁻ represents an anion which is not detrimental to the formation of the desired molecular sieve, such as those described above for formula (III).

The alkyl substitutions on the nitrogen atoms of the imidazole ring are any straight chain alkyl group having from 1 to about 10 carbon atoms. Thus, this moiety includes methyl, ethyl, propyl, n-butyl, as well as linear pentyl, hexyl, heptyl, octyl, nonyl, and decyl groups.

ZSM-22 type zeolites can also be prepared using piperidine derivatives as the organic templating compound. A preferred piperidine derivative is 2,6-dimethylpiperidine.

The as-made ZSM-22 zeolites have a crystalline structure whose X-ray powder diffraction pattern shows the following characteristic lines as indicated in Table B below:

TABLE B

| 2Theta | d/n | I/I₀ |
|---|---|---|
| 8.13 | 10.87 | 37.7 |
| 10.15 | 8.70 | 4.0 |
| 12.72 | 6.95 | 18.6 |
| 16.51 | 5.36 | 2.6 |
| 19.36 | 4.58 | 3.0 |
| 20.28 | 4.38 | 100.0 |
| 24.11 | 3.69 | 75.3 |

TABLE B-continued

| 2Theta | d/n | I/I₀ |
|---|---|---|
| 24.53 | 3.63 | 75.2 |
| 25.64 | 3.47 | 63.9 |

Zeolite SSZ-28

To prepare SSZ-28, sources of an N,N-dimethyltropinium or N,N-dimethyl-3-azonium bicyclo[3.2.2]nonane cation may be used as the organic templating compound.

The as-made SSZ-28 zeolites have a crystalline structure whose X-ray powder diffraction pattern shows the following characteristic lines as indicated in Table C below:

TABLE C

| 2Theta | d/n | I/I₀ |
|---|---|---|
| 7.62 | 11.58 | 11.0 |
| 11.28 | 7.83 | 7.1 |
| 12.94 | 6.84 | 9.6 |
| 15.36 | 5.76 | 64.7 |
| 17.09 | 5.18 | 100.0 |
| 18.24 | 4.86 | 32.0 |
| 18.80 | 4.71 | 31.8 |
| 19.66 | 4.51 | 40.1 |
| 21.40 | 4.14 | 26.0 |
| 24.85 | 3.58 | 12.1 |
| 26.18 | 3.40 | 64.5 |
| 26.49 | 3.40 | 28.0 |
| 26.85 | 3.32 | 28.6 |
| 28.14 | 3.17 | 13.7 |
| 29.75 | 3.00 | 13.0 |

Zeolite EU-1

The organic templating compounds useful in preparing EU-1 are alkylated derivatives of a polymethylene α-ω diamine having the formula:

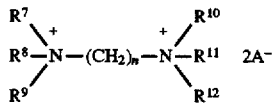

$$R^8\text{—}\underset{R^9}{\overset{R^7}{\underset{|}{\overset{|}{N}}}}\text{—}(CH_2)_n\text{—}\underset{R^{12}}{\overset{R^{10}}{\underset{|}{\overset{|}{N}}}}\text{—}R^{11} \quad 2A^-$$ (V)

wherein n is in the range from 3 to 12 and $R^7$ to $R^{12}$ which may be the same or different, can be alkyl or hydroxyalkyl groups, containing from 1 to 8 carbon atoms and up to five of the groups $R^7$-$R^{12}$ can be hydrogen, and $A^-$ represents an anion which is not detrimental to the formation of the desired zeolite, such as those described above for formula (III).

Preferred alkylated polymethylene diamine derivatives include alkylated hexamethylene diamines, especially methylated hexamethylene diamines, for example 1,6-N,N,N',N',N',N'-hexamethyl hexamethylene diammonium salts (e.g., halide, hydroxide, sulphate, silicate, aluminate).

Other organic templating compounds which can be used to prepare EU-1 in accordance with the present invention are 4-benzyl-N,N-dimethylpiperidinium compounds, which have the following structure:

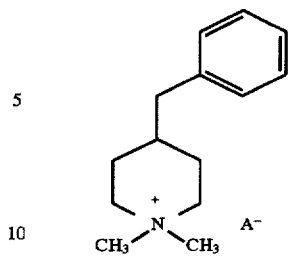

where $A^-$ represents an anion which is not detrimental to the formation of the desired molecular sieve, such as those described above for formula (III).

The as-made EU-1 zeolites have a crystalline structure whose X-ray powder diffraction pattern shows the following characteristic lines as indicated in Table D below:

TABLE D

| 2Theta | d/n | I/I₀ |
|---|---|---|
| 7.92 | 11.15 | 48.3 |
| 8.70 | 10.15 | 21.5 |
| 9.06 | 9.75 | 6.0 |
| 12.87 | 6.87 | 2.3 |
| 19.04 | 4.65 | 39.7 |
| 20.53 | 4.32 | 100.0 |
| 22.15 | 4.01 | 61.8 |
| 23.26 | 3.82 | 31.8 |
| 23.94 | 3.71 | 20.0 |
| 25.97 | 3.43 | 9.3 |
| 26.52 | 3.36 | 9.4 |
| 27.29 | 3.26 | 34.8 |

Zeolite SSZ-35

SSZ-35 can be prepared in accordance with the present invention using a polycyclic compound having the following formula as the organic templating compound:

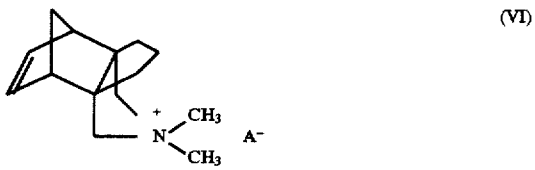

where $A^-$ is an anion which is not detrimental to the formation of the desired zeolite, such as those described above for formula (III). Another organic templating compound which may be used to prepare SSZ-35 in accordance with this invention is N-ethyl-N-methyl-9-azoniabicyclo[3.3.1]nonane which has the following structure:

where $L^-$ is an anion which is not detrimental to the production of the molecular sieve, such as those described above for formula (III).

The anion for the salt may be essentially any anion such as halide or hydroxide which is not detrimental to the formation of the molecular sieve. As used herein, "halide" refers to the halogen anions particularly fluorine, chlorine, bromine, iodine, and combinations thereof. Thus, representative anions include hydroxide, acetate, sulfate, carboxylate, tetrafluoroborate, and halides, such as fluoride, chloride, bromide and iodide. Hydroxide and iodide are particularly preferred as anions.

The N-ethyl-N-methyl-9-azabicyclo[3.3.1]nonane templating compound used in making SSZ-35 is a conformationally constrained organic molecule. Altering the structure of this relatively rigid molecule can lead to a change in the molecular sieve obtained, presumably due to the differing steric demands of each template. However, increasing the steric requirements of the template may lead to a decrease in crystallization rate as well as a decrease in template solubility in the reaction mixture. If the template is not sufficiently soluble, or if the template has particularly bulky substituent groups, it may be difficult to form crystals in the reaction mixture. Addition of a surfactant to the reaction mixture may help to solubilize the template.

The N-ethyl-N-methyl-9-azabicyclo[3.3.1]nonane templating compound may be synthesized by conventional techniques. In general, this template can be prepared in an efficient manner by condensing glutardialdehyde with a primary amine and acetone-dicarboxylic acid, all of which are readily available, inexpensive reagents. The intermediate formed is the 2,4-dicarboxy-3-keto-9-aza-bicyclononane, a di-β-ketoester which is easily decarboxylated upon treatment with acid. The 3-keto-moiety is removed by a classic Wolff-Kishner reduction (hydrazine, triethylene glycol, potassium hydroxide), and the desired quaternary ammonium salt is obtained by reaction of the resulting amine with an alkyl halide. Following purification by recrystallization, the halide salt can be ion-exchanged to the corresponding hydroxide salt using an ion-exchange resin.

The as-made SSZ-35 zeolites have a crystalline structure whose X-ray powder diffraction pattern shows the following characteristic lines as indicated in Table E below:

TABLE E

| 2Theta | d/n | I/I$_o$ |
|---|---|---|
| 7.99 | 11.05 | 100.0 |
| 9.65 | 9.16 | 7.4 |
| 15.37 | 5.76 | 17.0 |
| 18.88 | 4.69 | 43.7 |
| 19.32 | 4.59 | 62.6 |
| 19.82 | 4.48 | 30.1 |
| 21.60 | 4.11 | 17.8 |
| 22.80 | 3.89 | 20.8 |
| 25.68 | 3.47 | 29.6 |
| 27.41 | 3.25 | 27.3 |
| 29.20 | 3.06 | 17.6 |

Zeolite ZSM-12

Zeolite ZSM-12 can be prepared in accordance with this invention using a heterocyclic compound having the following formula as the organic templating compound:

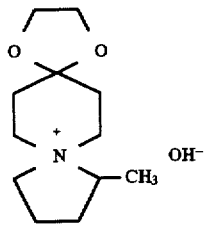

(VIII)

wherein L$^-$ is an anion which is not detrimental to the formation of the ZSM-12.

The as-made ZSM-12 zeolite has a crystalline structure whose X-ray powder diffraction pattern shows the following characteristic lines as indicated in Table F below:

TABLE F

| 2Theta | d | I/I$_o$ × 100 |
|---|---|---|
| 7.43 | 11.05 | 24.4 |
| 8.70 | 10.15 | 9.5 |
| 18.87 | 4.70 | 15.6 |
| 19.90 | 4.46 | 6.9 |
| 20.75 | 4.28 | 100.0 |
| 22.93 | 3.88 | 52.8 |
| 26.26 | 3.39 | 13.3 |
| 27.82 | 3.20 | 4.8 |
| 35.41 | 2.53 | 11.4 |

Another surprising aspect of this invention is that, when some organic templating compounds are used in combination with the amine component of this invention, a different zeolite structure is made than that which would be obtained in the absence of the amine component. For example, SSZ-35 has been made from organic templating compounds which are salts of 1,3,3,8,8-pentamethyl-3-azonia[3.2.1] octane. These compounds have a molecular structure of the general formula:

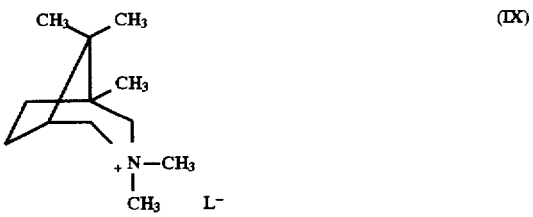

(IX)

wherein L$^-$ is an anion which is not detrimental to the formation of the zeolite. However, when these organic templating compounds are used in combination with the amine component of this invention, the resulting zeolite is SSZ-25.

Each organocation of this 1,3,3,8,8-pentamethyl-3-azonia [3.2.1]octane family has a charged quaternary ammonium heteroatom and two rings, one of which includes the quaternary ammonium heteroatom as a bridging unit. The anion for the salt may be essentially any anion such as halide or hydroxide which is not detrimental to the formation of the molecular sieve. As used herein, "halide" refers to the halogen anions particularly fluorine, chlorine, bromine, iodine, and combinations thereof. Thus, representative anions include hydroxide, acetate, sulfate, carboxylate, tetrafluoroborate, and halides such as fluoride, chloride, bromide, and iodide. Hydroxide and iodide are particularly preferred as anions.

Many of the organocation salts which have been disclosed in the prior art for use as templates for molecular sieve synthesis are conformationally flexible. These molecules can adopt many conformations in aqueous solution, and several templates can give rise to a single crystalline product. In contrast, the 1,3,3,8,8-pentamethyl-3-azoniabicyclo [3.2.1]octane templating compounds described above used to make SSZ-25 are conformationally constrained organic molecules.

These 1,3,3,8,8-pentamethyl-3-azoniabicyclo[3.2.1] octane compounds can be prepared by converting camphoric anhydride to the corresponding N-methyl imide using methyl amine. The imide can be reduced to N-methylcamphidine upon reduction with lithium aluminum hydride in ether, and the desired quaternary ammonium salt obtained by treatment with methyl iodide. Following purification by recrystallization, the halide salt can be ion-exchanged to the corresponding hydroxide salt using an ion-exchange resin.

EXAMPLES

EXAMPLE 1

Preparation of N,N,N-Trimethyl-1-
adamantanammonium Hydroxide (Template A)

Ten (10) grams of 1-adamantanamine (Aldrich) was dissolved in a mixture of 29 gms tributylamine and 60 mls dimethylformamide. The mixture was chilled in an ice bath.

28.4 Grams of methyl iodide were added dropwise to the chilled solution with continuous stirring. After several hours, crystals appear. The reaction was continued overnight and allowed to come to room temperature. The crystals were filtered and washed with tetrahydrofuran and then diethyl ether before vacuum drying. Additional product was obtained by adding enough diethyl ether to the reaction filtrate to produce two phases and then with vigorous stirring acetone was added until the solution just became one phase. Continued stirring produced crystallization at which time the solution can be chilled to induce further crystallization. The product has a melting point near 300° C. (decomp.) and the elemental analyses and NMR are consistent with the known structure. The vacuum-dried iodide salt was then ion-exchanged with ion-exchange resin AG 1X8 (in molar excess) to the hydroxide form. The exchange was performed over a column or more preferably by overnight stirring of the resin beads and the iodide salt in an aqueous solution designed to give about a 0.5 molar solution of the organic hydroxide. This produces Template A.

EXAMPLE 2

Preparation of N,N,N-Trimethyl-2-
adamantanammonium Hydroxide (Template B)

Five (5) grams of 2-adamantanone (Aldrich Chemical Co.) was mixed with 2.63 gms of formic acid (88%) and 4.5 gms of dimethyl formamide. The mixture was then heated in a pressure vessel for 16 hours at 190° C. Care should be taken to anticipate the increase in pressure the reaction experiences due to $CO_2$ evolution. The reaction was conveniently carried out in a Parr 4748 reactor with teflon liner. The workup consists of extracting N,N-dimethyl-2-adamantanamine from a basic (pH=12) aqueous solution with diethyl ether. The various extracts were dried with $Na_2SO_4$, the solvent removed and the product taken up in ethyl acetate. An excess of methyl iodide was added to a cooled solution which was then stirred at room temperature for several days. The crystals were collected and washed with diethyl ether to give N,N,N-trimethyl-2-adamantammonium iodide. The product is checked by microanalysis for C, H, and N. The conversion to the hydroxide form was carried out analogously to Template A above.

EXAMPLE 3

Synthesis of SSZ-25

0.50 Grams of a 0.55 molar solution of Template B and 0.22 gms of isobutyl amine and 0.03 gms.of SSZ-25 seeds were mixed with 0.20 gms KOH(s), 0.083 gms of Reheis F-2000 hydrated alumina (50–56 wt% aluminum oxide), and 11.4 Ml $H_2O$. After thorough mixing, 0.90 gms of Cabosil M5 was blended in as silica source. The reaction mixture was heated in the Teflon cup of a Parr 4745 reactor at 170° C. at 43 rpm for 4 days. Workup produced crystalline SSZ-25.

EXAMPLE 4

Synthesis of SSZ-25

In this example, the use of a nonquaternized amine is demonstrated. The same experiment was run as in Example 3, millimole of 1-adamantanamine (Aldrich) replaced late B. The product was again SSZ-25.

EXAMPLE 5

Synthesis of SSZ-25

This example also demonstrates the use of a nonquaternized amine. 12.5 Grams of Reheis F-2000 was dissolved in 30 gms of kOH(s) and 1500 Ml $H_2O$ 7.5 gms of 1-adamantanamine (Aldrich Chemical Co.), and 75 gms of 4-methylpiperidine (Aldrich Chemical Co.). 3 Grams of SSZ-25 seed crystals and 437 of Ludox AS-30 were added last. The reaction was run in a 1-gallon autoclave with Hastelloy C liner at 170° C. and 75 rpm. After 6 days, the product was crystalline SSZ-25

Refer to Table 3 for a summary of Examples 3–5.

TABLE 3

| Ex. No. | Adamantyl Component | Amine | Product |
|---|---|---|---|
| 3 | Template B | Isobutyl Amine | SSZ-25 |
| 4 | 1-adamantanamine | Isobutyl Amine | SSZ-25 |
| 5 | 1-adamantanamine | 4-methylpiperidine | SSZ-25 |

EXAMPLES 6–9

Synthesis of SSZ-25

In these examples, the effectiveness or necessity of the adamantyl quaternary ammonium ion is demonstrated by comparison of reaction products with and without such a component at only a 0.02 molar ratio to silica. This quantity of adamantyl component is insufficient to fill the micropore volume of the growing SSZ-25 and additional organic is needed, and was subsequently found in the micropore system. Table 4 shows the comparative examples.

TABLE 4

SSZ-25 Syntheses With and Without Adamantyl Quaternary Ammonium Ion Synthesis Promoters[a]

| Ex. No. | Adamantyl Component | Amine[b] | $SiO_2/Al_2O_3$ | $KOH/SiO_2$ | Product |
|---|---|---|---|---|---|
| 6 | B | Piperidine | 35 | 0.20 | SSZ-25 |
| 7 | — | Piperidine | 35 | 0.20 | ZSM-5 |
| 8 | B | Cyclopentylamine | 35 | 0.20 | SSZ-25 |
| 9 | — | Cyclopentylamine | 35 | 0.20 | ZSM-5 |

[a]Experiments carried out as in Example 3.
[b]Experiments carried out using amine/$SiO_2$ ratio of 0.20.
B = Template B (Example 2).

EXAMPLES 10–12

Synthesis of SSZ-25

In these experiments, the variation of the adamantane compound is demonstrated. The experiments are carried out as in Example 3. Recall that in Example 7, the use of piperidine alone, even in the presence of SSZ-25 seeds, produced ZSM-5.

Refer to Table 5 for the variations of the adamantane compound.

TABLE 5

| Ex. No. | Adamantyl Component* | Piperidine/SiO$_2$ | SiO$_2$/Al$_2$O$_3$ | KOH/SiO$_2$ | Product |
|---|---|---|---|---|---|
| 10 | A | 0.20 | 35 | 0.20 | SSZ-25 |
| 11 | C | 0.20 | 35 | 0.20 | SSZ-25 |
| 12 | D | 0.20 | 35 | 0.20 | SSZ-25 |

*At a level of 0.02 relative to SiO$_2$.
A = Template A (Example 1).
C = Quaternized derivative of 1-aminomethyl-adamantane.
D = 1-adamantanol.

EXAMPLES 13–20

Synthesis of SSZ-25

In these examples, SSZ-25 was formulated, using SSZ-25 as a seed material in two examples and using no seed in two examples to determine whether seed material was necessary to produce SSZ-25. The final product was SSZ-25 in all cases. In the examples where 4-methylpiperidine was used as the amine component, improvement in growth time was observed at three days for the example utilizing seed material. In the examples where isobutylamine was used as the amine component, the growth time was improved by at least a factor of two for the example utilizing seed material.

In these examples, 1 millimole of 1-adamantanamine was mixed with 15 millimoles of silica as SiO$_2$ and 3 millimoles of the smaller amine. All of the remaining ratios of reactants and run conditions were as in Example 3. In Examples 13–16, the major amine was 4-methylpiperidine. For Examples 17–20, the major amine was isobutylamine. Reaction conditions were substantially the same as those in Example 3. Results are summarized in Table 6.

TABLE 6

Effect of seed on type of zeolite produced and growth time for SSZ-25

| Ex. No. | Amine Component | Seed Used | Growth Time | Product |
|---|---|---|---|---|
| 13 | 4-methylpiperidine | SSZ-25 | 3 days | SSZ-25 + amorphous |
| 14 | 4-methylpiperidine | SSZ-25 | 6 days | SSZ-25 |
| 15 | 4-methylpiperidine | none | 3 days | amorphous |
| 16 | 4-methylpiperidine | none | 6 days | SSZ-25 |
| 17 | isobutylamine | SSZ-25 | 3 days | SSZ-25 |
| 18 | isobutylamine | SSZ-25 | 6 days | SSZ-25 |
| 19 | isobutylamine | none | 3 days | SSZ-25 + amorphous |
| 20 | isobutylamine | none | 6 days | SSZ-25 |

EXAMPLES 21–28

Synthesis of SSZ-32

A basic reaction solution was made by combining 0.50 millimoles of N,N'-diisopropylimidazolium hydroxide late E), 0.20 gram of solid KOH, 0.083 gram of Reheis F-2000 hydrated aluminum hydroxide, and a total of 11.4 ml of water. To this solution, 0.90 gram of Cabosil M-5 fumed silica (98%) was added. Finally, 0.20 gram of isobutyl amine was added. These reactants were all combined in the Teflon cup of a Parr 4745 reactor (23 ml capacity). The reactor was sealed and loaded onto a rotating spit in a Blue kM oven and heated at 170° C. for 6 days while rotating at 43 rpm. After this time period, the reactor was cooled in air, the resulting solid product filtered and washed with water in a funnel, and then air-dried. The resulting powder was analyzed by X-ray diffraction (XRD) and found to be SSZ-32. An elemental analysis showed the SiO$_2$/Al$_2$O$_3$ ratio for this product to be 28.

This reaction was repeated using each in turn the amines listed in Table 7 below in the quantities also shown in that table. The product of each reaction was SSZ-32.

TABLE 7

| Example No. | Amine | Amount of Amine |
|---|---|---|
| 22 | methylamine | 0.5 g* |
| 23 | NH$_4$OH | 0.66 g** |
| 24 | butylamine | 0.20 g |
| 25 | t-butylamine | 0.25 g |
| 26 | dipropylamine | 0.22 g |
| 27 | isopropylamine | 0.20 g |
| 28 | cyclopentylamine | 0.26 g |

*40% aqueous solution
**30% aqueous solution

These examples demonstrate that SSZ-32 can be prepared using very low levels of the organic templating compound, in this case a mole ratio of Template E/SiO$_2$ of only 0.033. In fact, his reaction has been successfully conducted with this ratio as low as 0.02. Without the addition of the small mine (isobutyl amine) the product, SSZ-32, would not be achieved at this low level of templating compound.

EXAMPLE 29–39

A procedure similar to that described in Examples 21–28 was used to prepare the zeolites listed in the table below except that the organic template was N,N,N-trimethyl-1,1,3,3-tetramethyl butyl ammonium hydroxide (Template E') and the amines were those listed in the table below.

The reaction mixture contained the following mole ratios:

Template E'/SiO$_2$ =0.02

Amine/SiO$_2$ =0.20

Also, the reaction mixture contained 0.6 wt. % SSZ-32 seed crystals.

| Ex No. | Amine | Growth Time | Product |
|---|---|---|---|
| 29* | isobutylamine | 9 days | SSZ-32 (plus trace amorphous) |
| 30* | cyclopentylamine | 9 days | SSZ-32 |
| 31* | isopropylamine | 7 days | SSZ-32 |
| 32* | n-butylamine | 7 days | ZSM-5 (plus minor amount of ferrierite) |
| 33* | piperidine | 7 days | ZSM-5 |
| 34* | cyclohexylamine | 18 days | ferrierite (plus minor amount of cristobalite) |
| 35* | 1,1,3,3-tetramethylbutyl amine | 7 days | SSZ-32 |
| 36** | isobutylamine | 6 days | SSZ-32 (plus trace cristobalite) |
| 37** | isopropylamine | 7 days | SSZ-32 (plus cristobalite) |
| 38** | n-butylamine | 7 days | cristobalite + ZSM-5 + quartz |
| 39** | piperidine | 7 days | ZSM-5 (plus – amorphous material) |

*Silica source was Nyacol colloidal silica.
**Silica source was Cabosil fumed silica.

EXAMPLE 40

Synthesis of SSZ-28

The same reaction as described in Example 21 for SSZ-32 was carried out, but with the following changes. The organic templating compound was N,N-dimethyl-3-azonium bicyclo [3.2.2]nonane hydroxide (Template F), and the ratio of Template F/SiO$_2$ was 0.05 (i.e., 0.75 millimoles of Template F was used in the reaction). The resulting product was found to be SSZ-28 by XRD.

This example also demonstrates that zeolites can be prepared by the method of this invention using very low amounts of organic templating compound.

EXAMPLE 41

Synthesis of EU-1

The same reaction using the same molar quantities described in Example 40 was carried out with the exception that the organic templating compound was the diquaternary ammonium compound 1,6-N,N,N,N',N',N'-hexamethyl hexamethylene diammonium hydroxide (Template G). The resulting product was analyzed by XRD and found to be zeolite EU-1.

EXAMPLE 42

Synthesis of EU-1

0.62 Gram of a solution of 4-benzyl-N,N-dimethylpiperidinium hydroxide (0.485 mmol OH$^-$/g), 0.08 gram of Reheis F2000 hydrated aluminum hydroxide, and 0.20 gram of solid KOH were dissolved in 11.4 grams of water. Isobutyl amine (0.22 gram) was added to this solution, followed by the addition of 0.90 gram of Cabosil M-5 fumed silica. The resulting reaction mixture was mixed thoroughly and sealed in a Parr 4745 reactor which was then heated to 170° C. and rotated at 43 rpm. After 16 days the reaction was complete, and the product which was isolated was determined by XRD to be EU-1.

EXAMPLE 43

Synthesis of SSZ-35

The same reaction using the same molar quantities described in Example 40 was carried out, except that the organic templating compound used was the polycyclic compound having formula VI above (Template H). The resulting product was determined by XRD to be SSZ-35.

EXAMPLE 44

Synthesis of ZSM-22 type structures

The same reaction described in Example 21 was carried out, except that the organic templating compound was 2,6-dimethylpiperidine (Template I) which was used in the ratio of Template I/SiO$_2$ of 0.02. The resulting product was determined by XRD to be ZSM-22 type structures.

EXAMPLE 45

Using the procedure of Example 21 and the amines and organic templating compounds shown in Table 8, the zeolites also shown in Table 8 were prepared.

TABLE 8

| Zeolite | Amine | Amount of Amine | Template |
|---------|-------|-----------------|----------|
| SSZ-28 | cyclopentylamine | 0.26 g | F |
| SSZ-25 | piperidine | 0.26 g | F |
| EU-1 | cyclopentylamine | 0.26 g | G |
| SSZ-35 | cyclopentylamine | 0.26 g | H |
| SSZ-35 | piperidine | 0.26 g | H |

TABLE 8-continued

| Zeolite | Amine | Amount of Amine | Template |
|---------|-------|-----------------|----------|
| ZSM-22 | cyclopentylamine | 0.26 g | I |
| ZSM-22 | piperidine | 0.26 g | I |

EXAMPLE 46 Synthesis of ZSM-12

The same procedure described in Example 21 was performed, except that a piperidine-based templating agent (Template J) having the following structure:

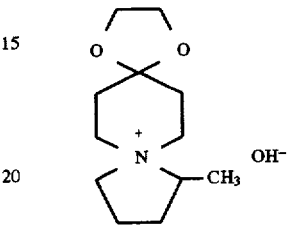

was used in place of the imidazolium-based template employed in Example 21. After 23 days of heating at 170° C., the product was isolated and identified as ZSM-12. Elemental analysis showed the product to have a SiO$_2$/Al$_2$O$_3$ mole ratio of 30.

What is claimed is:

1. A method for preparing a zeolite selected from the group consisting of large pore zeolites, medium pore zeolites having unidimensional channels, and small pore zeolites, said method comprising:

A. forming an aqueous reaction mixture comprising (1) a source of an oxide selected from silicon oxide, germanium oxide and mixtures thereof; (2) a source of an oxide selected from aluminum oxide, gallium oxide, iron oxide, boron oxide, titanium oxide and mixtures thereof; (3) a source of an alkali metal oxide; (4) an amine component comprising at least one amine containing one to eight carbon atoms, ammonium hydroxide, and mixtures thereof, and (5) an organic templating compound capable of forming said zeolite in the presence of said amine, wherein said amine is smaller than said organic templating compound and wherein said organic templating agent is used in an amount less than that required to crystallize the zeolite in the absence of said amine component; and B. maintaining said aqueous mixture under sufficient crystallization conditions until crystals are formed.

2. The method of claim 1 wherein the large pore zeolite has unidimensional channels.

3. The method of claim 1 wherein the large pore zeolite has multidimensional channels.

4. The method of claim 1 wherein said organic templating compound is selected from the group consisting of quaternary ammonium ions, cyclic amines and polar adamantyl derivatives.

5. The method of claim 1 wherein the amine component comprises an aliphatic, cycloaliphatic or heterocyclic amine, ammonium hydroxide or mixtures thereof.

6. The method of claim 5 wherein the amine component comprises a compound selected from the group consisting of isobutylamine, methylamine, ammonium hydroxide, butylamine, t-butylamine, dipropylamine, isopropylamine, cyclopentylamine, piperidine, 4-methylpiperidine, cyclohexylamine, and 1,1,3,3-tetramethylbutyl amine.

7. The method of claim 1 wherein said aqueous mixture further comprises seeds of zeolite crystals in an amount sufficient to direct and accelerate crystallization.

8. The method of claim 1 wherein the reaction mixture comprises the following in terms of mole ratios:

| | |
|---|---|
| $M/YO_2$ | 0.01–0.50 |
| $OH^-/YO_2$ | 0.01–0.60 |
| $H_2O/YO_2$ | 10–120 |
| $[Q/YO_2$ | 0.02–1.00] |
| $YO_2/W_2O_3$ | 10–200 |
| $Z/YO_2$ | 0.05–1.00 | where M is an alkali metal, Y is silicon, germanium, or both; Z is the amine component; and W is aluminum, gallium, iron, boron, titanium or mixtures thereof.

9. The method of claim 8 wherein the reaction mixture comprises the following in terms of mole ratios:

| | |
|---|---|
| $M/YO_2$ | 0.10–0.20 |
| $OH^-/YO_2$ | 0.10–0.30 |
| $H_2O/YO_2$ | 20–50 |
| $[Q/YO_2$ | 0.02–0.10] |
| $YO_2/W_2O_3$ | 15–120 |
| $Z/YO_2$ | 0.20–0.40. |

10. The method of claim 4 wherein the zeolite has, after calcination, the X-ray diffraction pattern of Table 2.

11. The method of claim 10 wherein the organic templating compound comprises adamantanamine.

12. The method of claim 11 wherein said adamantanamine comprises at least one adamantanamine from the group 1-adamantanamine or 2-adamantanamine.

13. The method of claim 11 wherein the amine component comprises isobutylamine, 4-methylpiperidine, cyclopentylamine, or piperidine.

14. The method of claim 11 wherein the organic templating compound comprises adamantanol.

15. The method of claim 14 wherein said adamantanol comprises at least one adamantanol from the group 1-adamantanol and 2-adamantanol.

16. The method of claim 14 wherein the amine component comprises piperidine or isobutylamine.

17. The method of claim 4 wherein the as-synthesized zeolite has the X-ray diffraction pattern of Table A.

18. The method of claim 17 wherein the organic templating compound comprises an N,N'-disubstituted imidazolium compound or N,N,N-trialkyl-1,1,3,3-tetraalkyl butyl ammonium cation.

19. The method of claim 18 wherein the imidazolium compound is an N,N'-diisopropylimidazolium cation, or N-methyl-N'-isopropylimidazolium cation.

20. The method of claim 18 wherein the N,N,N-trialkyl-1,1,3,3-tetraalkyl butyl ammonium cation is a N,N,N-trimethyl-1,1,3,3-tetramethylbutyl ammonium cation.

21. The method of claim 18 wherein the organic templating compound comprises an N,N'-disubstituted imidazolium compound and the amine component comprises a compound selected from the group consisting of isobutylamine, methylamine, ammonium hydroxide, butylamine, t-butylamine, dipropylamine, isopropylamine, and cyclopentylamine.

22. The method of claim 18 wherein the organic templating compound comprises an N,N,N-trialkyl-1,1,3,3-tetraalkyl butyl ammonium cation and the amine component is selected from the group consisting of isobutylamine, cyclopentylamine, isopropylamine and 1,1,3,3-tetramethylbutyl amine.

23. The method of claim 4 wherein the zeolite has, in the as-synthesized form, the X-ray diffraction pattern of Table B.

24. The method of claim 23 wherein the organic templating compound comprises a piperidine derivative.

25. The method of claim 24 wherein the piperidine derivative is 2,6-dimethylpiperidine.

26. The method of claim 24 wherein the amine component comprises isobutylamine, cyclopentylamine or piperidine.

27. The method of claim 23 wherein the organic templating compound comprises imidazole salts of the formula

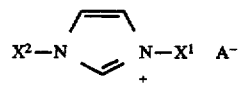

wherein $X^1$ and $X^2$ independently represent a linear alkyl group containing from 1 to about 10 carbon atoms, and $A^-$ represents an anion which is not detrimental to the formation of the zeolite.

28. The method of claim 4 wherein the zeolite has, in the as-synthesized form, the X-ray diffraction pattern of Table C.

29. The method of claim 28 wherein the organic templating compound is selected from the group consisting of N,N-dimethyltropinium and N,N-dimethyl-3-azonium bicyclo[3.2.2]nonane cations.

30. The method of claim 29 wherein the amine component comprises isobutylamine, cyclopentylamine, or piperidine.

31. The method of claim 4 wherein the zeolite has, in the as-synthesized form, the X-ray diffraction pattern of Table D.

32. The method of claim 31 wherein the organic templating compound comprises alkylated derivatives of a polymethylene diamine having the formula

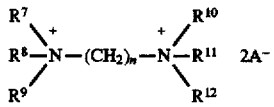

wherein n is in the range from 3 to 12, $R^7$ to $R^{12}$, which may be the same or different, are hydrogen, alkyl or hydroxyalkyl groups, containing from 1 to 8 carbon atoms and up to five of the groups $R^7$–$R^{12}$ can be hydrogen, and $A^-$ is an anion which is not detrimental to the formation of the zeolite.

33. The method of claim 32 wherein the organic templating compound comprises a 1,6-N,N,N,N',N',N'-hexamethyl hexamethylene diammonium cation.

34. The method of claim 32 wherein the amine component comprises isobutylamine or cyclopentylamine.

35. The method of claim 31 wherein the organic templating compound is a 4-benzyl-N,N-dimethylpiperidinium compound.

36. The method of claim 35 wherein the amine component comprises isobutylamine.

37. The method of claim 4 wherein the zeolite has, in the as-synthesized form, the X-ray diffraction pattern of Table E.

38. The method of claim 37 wherein the organic templating compound is selected from the group consisting of an N-ethyl-N-methyl-9-azoniabicyclo[3.3.1]nonane cation and a compound having the following formula:

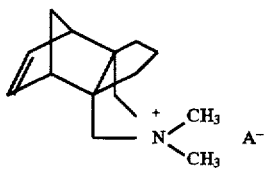

where A⁻ is an anion which is not detrimental to the formation of the zeolite.

39. The method of claim 38 wherein the amine component comprises isobutylamine, cyclopentylamine or piperidine.

40. The method of claim 4 wherein the as-synthesized zeolite has the X-ray diffraction pattern of Table F.

41. The method of claim 40 wherein the organic templating compound comprises a compound having the following formula:

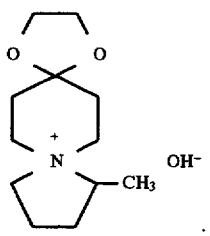

42. The method of claim 41 wherein the amine component comprises isobutylamine.

43. A zeolite selected from the group consisting of large pore zeolites, medium pore zeolites having unidimensional channels, and small pore zeolites having an as-synthesized molar composition in an anhydrous state of (0.02 to 2.0)Q: (0.02 to 1.0)Z: (0.1 to 2.0)$M_2O$:$W_2O_3$:(10 to 200)$YO_2$, wherein M is an alkali metal cation; W is selected from aluminum, gallium, iron, boron, titanium and mixtures thereof; Y is selected from silicon, germanium, and mixtures thereof; Z is an amine component comprising at least one amine containing from one to eight carbon atoms, ammonium hydroxide, and mixtures thereof, Q is an organic templating compound capable of forming the zeolite in the presence of said amine component, wherein said amine is smaller than the organic templating compound and wherein said organic templating agent is used in an amount less than that required to crystallize the zeolite in the absence of said amine component.

44. The zeolite of claim 43 having, after calcination, the X-ray diffraction pattern of Table 2.

45. The zeolite of claim 43 having, in the as-synthesized form, the X-ray diffraction pattern of Table A.

46. The zeolite of claim 43 having, in the as-synthesized form, the X-ray diffraction pattern of Table B.

47. The zeolite of claim 43 having, in the as-synthesized form, the X-ray diffraction pattern of Table C.

48. The zeolite of claim 43 having, in the as-synthesized form, the X-ray diffraction pattern of Table D.

49. The zeolite of claim 43 having, in the as-synthesized form, the X-ray diffraction pattern of Table E.

50. The zeolite of claim 43 having, in the as-synthesized form, the X-ray diffraction pattern of Table F.

* * * * *